US012559321B2

(12) United States Patent　　　　　(10) Patent No.:　US 12,559,321 B2
Lawson et al.　　　　　　　　　　　　(45) Date of Patent:　　Feb. 24, 2026

(54) CONVEYOR IDLERS REPLACEMENT SYSTEM

(71) Applicant: Conveyor Dynamics, Inc., Bellingham, WA (US)

(72) Inventors: Bradley Lawson, Ferndale, WA (US); Andrew Jennings, Bellingham, WA (US); Brandt Porter, Bellingham, WA (US)

(73) Assignee: Conveyor Dynamics, Inc., Bellingham, WA (US)

( * ) Notice: Subject to any disclaimer, the term of this patent is extended or adjusted under 35 U.S.C. 154(b) by 137 days.

(21) Appl. No.: 18/554,989

(22) PCT Filed: Jun. 29, 2022

(86) PCT No.: PCT/US2022/035586
§ 371 (c)(1),
(2) Date: Oct. 11, 2023

(87) PCT Pub. No.: WO2023/278620
PCT Pub. Date: Jan. 5, 2023

(65) Prior Publication Data
US 2024/0199341 A1　　　Jun. 20, 2024

Related U.S. Application Data

(60) Provisional application No. 63/218,147, filed on Jul. 2, 2021.

(51) Int. Cl.
B65G 21/06　　　(2006.01)
B65G 21/10　　　(2006.01)
(Continued)

(52) U.S. Cl.
CPC ............. B65G 21/06 (2013.01); B65G 21/10 (2013.01); B65G 41/00 (2013.01)

(58) Field of Classification Search
CPC ...... B65G 21/06; B65G 21/10; B65G 21/105; B65G 39/00; B65G 39/12; B65G 41/00; B65G 41/007
See application file for complete search history.

(56) References Cited

U.S. PATENT DOCUMENTS 3,614,823 A * 10/1971 Weber et al. .......... B65G 15/00
29/244
7,810,788 B2 10/2010 Devries
(Continued)

FOREIGN PATENT DOCUMENTS

AU　　2022304667　　12/2023
BR　1120230274630　12/2023
(Continued)

OTHER PUBLICATIONS

US 2025/0197121 A1, Neff et al., Jun. 19, 2025.*

*Primary Examiner* — Douglas A Hess
(74) *Attorney, Agent, or Firm* — Puget Sound Patents; Dwayne E Rogge

(57) ABSTRACT

A conveyor idler replacement system in one example with an H-frame (support frame). The system including a base with a first vertical strut extending from the base, a second vertical strut extending substantially vertically from the base; each of the first vertical strut and second vertical strut comprising a first idler frame bracket on a first longitudinal side of the H-frame; a first idler frame extending between the first idler frame bracket on the first vertical strut and the first idler frame bracket on the second vertical strut; at least one idler attached to the first idler frame, the idler configured to rotate, configured to support a conveyor belt. Including a system for lifting the belt and replacing idler frames.

7 Claims, 7 Drawing Sheets

(51) Int. Cl.
B65G 39/00 (2006.01)
B65G 39/12 (2006.01)
B65G 41/00 (2006.01)

(56) References Cited

U.S. PATENT DOCUMENTS

| | | | |
|---|---|---|---|
| 9,126,767 B2 | 9/2015 | Carter | |
| 9,428,372 B2 | 8/2016 | Arif et al. | |
| 10,071,860 B2 | 9/2018 | Kahrger et al. | |
| 11,242,204 B1 * | 2/2022 | Zsido ........................ | B66F 3/46 |
| 2015/0151917 A1 | 6/2015 | Campbell | |

FOREIGN PATENT DOCUMENTS

| | | | |
|---|---|---|---|
| CA | 3 225 355 | 12/2023 | |
| CN | 2022800464136 | 12/2023 | |
| DE | 102013205041 A1 * | 9/2014 | ............ B65G 39/00 |
| SU | 1278280 A1 | 12/1986 | |
| WO | WO-2016058035 A1 * | 4/2016 | ............. E21F 13/00 |
| ZA | 202311526 | 12/2023 | |

* cited by examiner

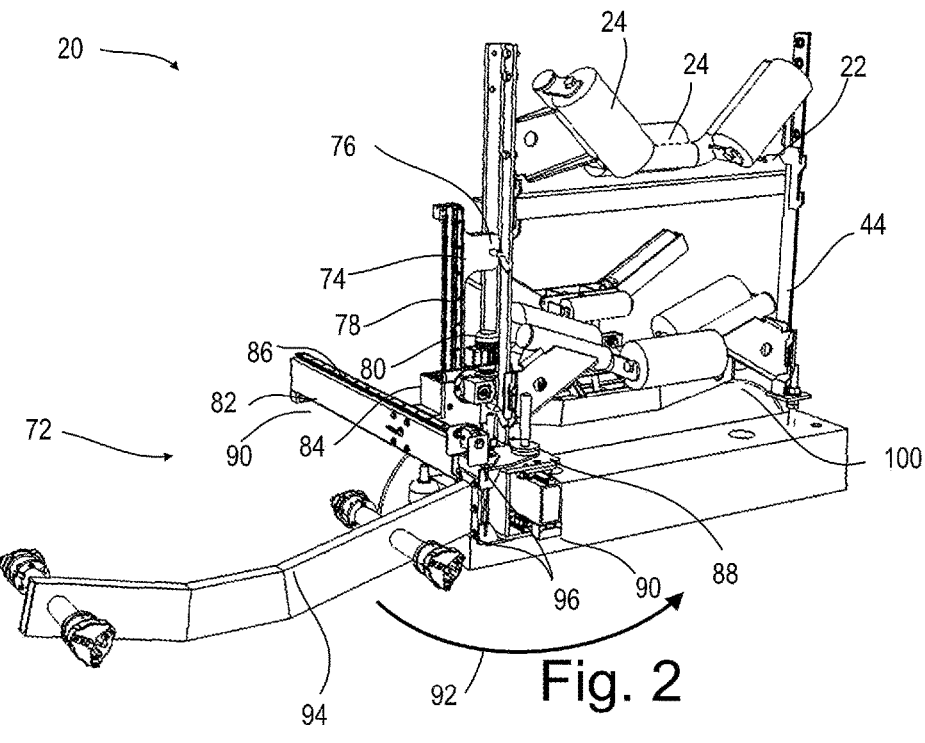
Fig. 2
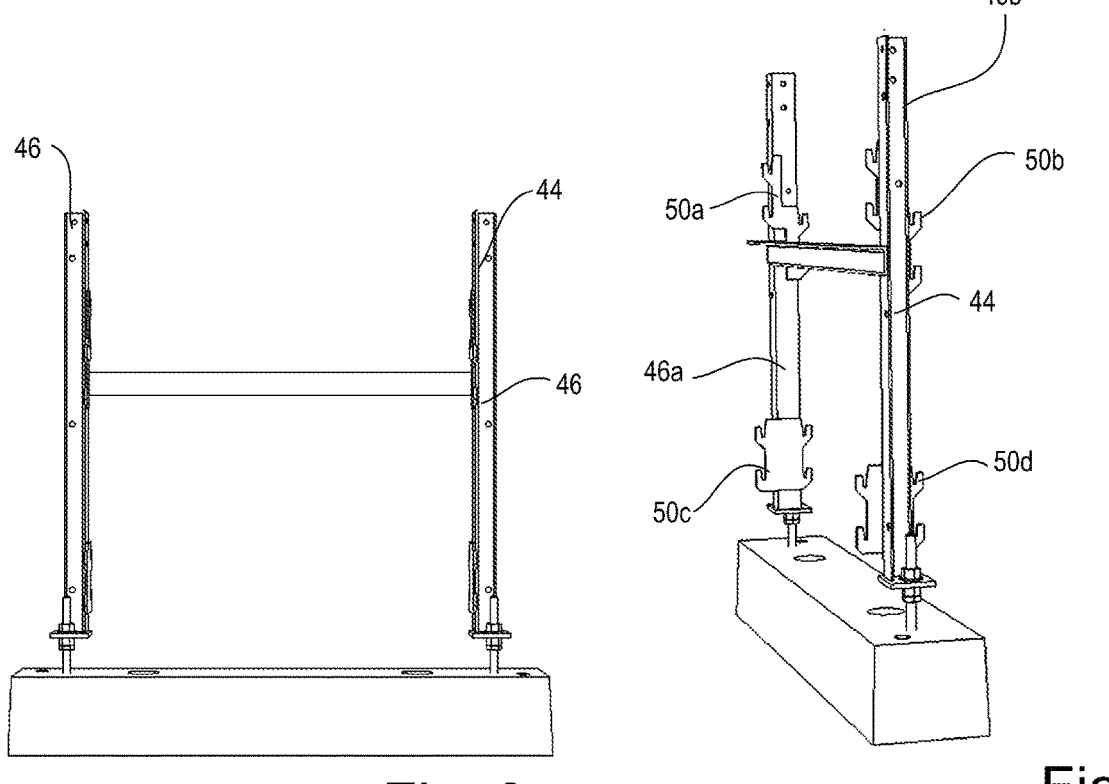
Fig. 3
Fig. 4

CONVEYOR IDLERS REPLACEMENT SYSTEM

BACKGROUND OF THE DISCLOSURE

Field of the Disclosure

This discourse related to the field of apparatus and methods used in conjunction to form a system to easily and safely inspect, remove, and replace conveyor belt idlers. In one example this is accomplished while the conveyor belt is operating, transporting material on a delivery line of the conveyor belt.

BRIEF SUMMARY OF THE DISCLOSURE

A conveyor idler replacement system in one example comprising: an H-frame fixed in place, comprising a base with a first vertical strut extending from the base, a second vertical strut extending substantially vertically from the base; each of the first vertical strut and second vertical strut comprising a first idler frame bracket on a first longitudinal side of the H-frame; a first idler frame extending between the first idler frame bracket on the first vertical strut and the first idler frame bracket on the second vertical strut; at least one idler attached to the first idler frame, the idler configured to rotate, configured to support a conveyor belt.

The conveyor idler replacement system may be arranged where each of the first vertical strut and second vertical strut comprise a third idler frame bracket on the first longitudinal side of the H-frame vertically offset from the first idler frame bracket.

The conveyor idler replacement system may be arranged where each of the first vertical strut and second vertical strut comprising a second idler frame bracket on a second longitudinal side of the H-frame opposing the first longitudinal side.

The conveyor idler replacement system may be arranged where each of the first vertical strut and second vertical strut comprising a fourth idler frame bracket on the second longitudinal side of the H-frame vertically offset from the first idler frame bracket.

The conveyor idler replacement system may further comprise: a second idler frame extending between the third idler frame bracket on the first vertical strut and the third idler frame bracket on the second vertical strut; and at least one idler attached to the second idler frame, the idler configured to rotate, configured to support the conveyor belt.

The conveyor idler replacement system may further comprise: a pull cord plane defined by a vertical line, the laterally outward edge of the conveyor belt; a grip arm removably affixed to the H-frame exterior of the pull cord plane; the grip arm configured to rotate in a horizontal plane from a first position exterior of the pull cord plane to a second position interior of the pull cord plane; at least one clamp affixed to the grip arm, the at least one clamp configured to affix the grip arm to the idler frame to remove the idler frame from direct connection to the H-frame; and the grip arm configured to rotate the idler frame exterior of the pull cord plane.

The conveyor idler replacement system as recited may further comprise: a lift arm removably attached to the H-fame exterior of the pull cord plane; a slide arm removably attached to the lift arm, the slide arm vertically moveable along the lift arm, the slide arm having longitudinal ends; the grip arm affixed to the slide arm and configured to slide there along; and the grip arm configured to rotate about at least one of the longitudinal ends of the slide arm.

BRIEF DESCRIPTION OF THE SEVERAL VIEWS OF THE DRAWINGS

FIG. 2 is an enlarged view of several components of the example shown in FIG. 1.

FIG. 3 is a front view of an H-frame component of the apparatus shown in FIG. 1.

FIG. 4 is a side view of the H-frame component shown in FIG. 3.

DETAILED DESCRIPTION OF THE DISCLOSURE

In the field of conveyor belts, the idlers (rollers) which support the conveyor belt are often in need of inspection, cleaning, repair and replacement (the collective term "maintenance" used herein to cover these and equivalents). In many instances, this has been accomplished by shutting down the conveyor belt and bringing in staff to lift the belt off of the idlers, check them, and conduct any maintenance or replacement needed. This can create significant disruption especially where there are many idlers to be checked or the number of available equipment and staff are limited.

Because of the dangers of operators working "inside the pull cord line" it is not safe, nor allowed for workers to service the idlers in place while the conveyor is operating.

More recently, robotic devices have been implemented. Such devices use a first robotic arm and sensors to lift the conveyor belt off of the idlers, and a second robotic arm and sensors to detect, maintain, remove, and replace the idlers. Such devices are prohibitively expensive, prone to incorrect operation, and are also prone to failure. Such devices are also prone to malfunction, damage, and repair especially when used in a hot, dusty, dirty environment common where such conveyors are used.

The conveyor idler replacement system 20 disclosed herein is configured to remove a conveyor belt idler frame 22 with conveyor belt idlers 24 attached thereto exterior of the pull cord plane 26. Idlers are often non-powered rollers or wheels rotating about an axis and configured to support the conveyor belt. Once the idlers 24 are outside of the pull cord plane 26, the idlers 24 and attached components may be tested, inspected, removed, repaired, and/or replaced easily and safely. One goal of the device disclosed herein is to facilitate such actions safely and easily.

Figure 1:
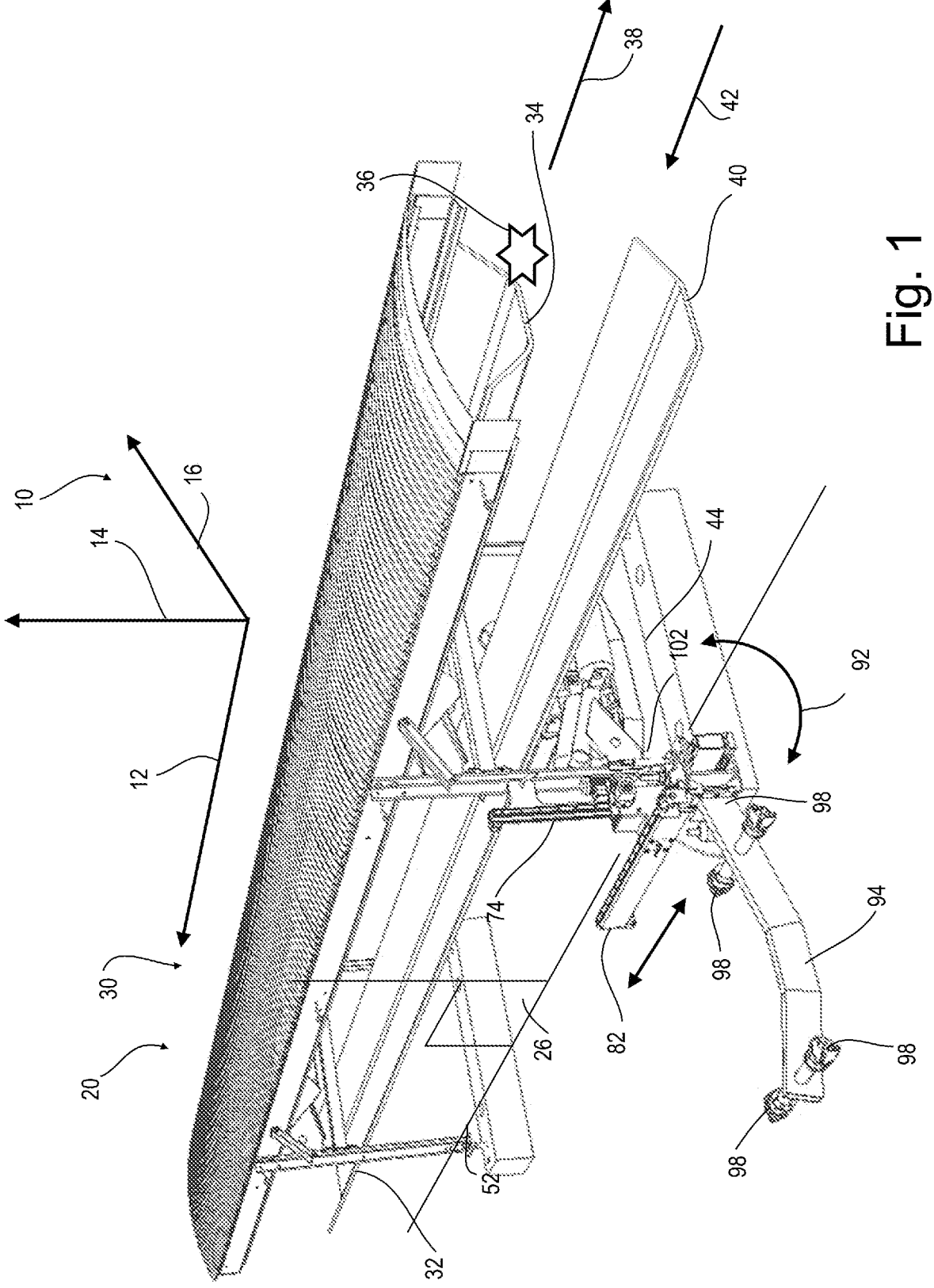
FIG. 1 is an environmental view of one example of the disclosed conveyor idlers replacement system in use.

Such conveyor systems 30 as shown in FIG. 1 include a conveyor (conveyor belt) 32 which is generally a loop or continuous belt, having a carry line 34 transporting material 36 in a first (carry) direction 38. Once the belt passes a longitudinal (discharge) end of the conveyor system 30, the belt 32 turns and returns to an opposing longitudinal (load) end. This is accomplished via a return line 40 in a second (return) direction 42. Thus, the conveyor belt 32, being in one example a continuous loop, may continue operation moving material 36 without interruption.

Figure 5:
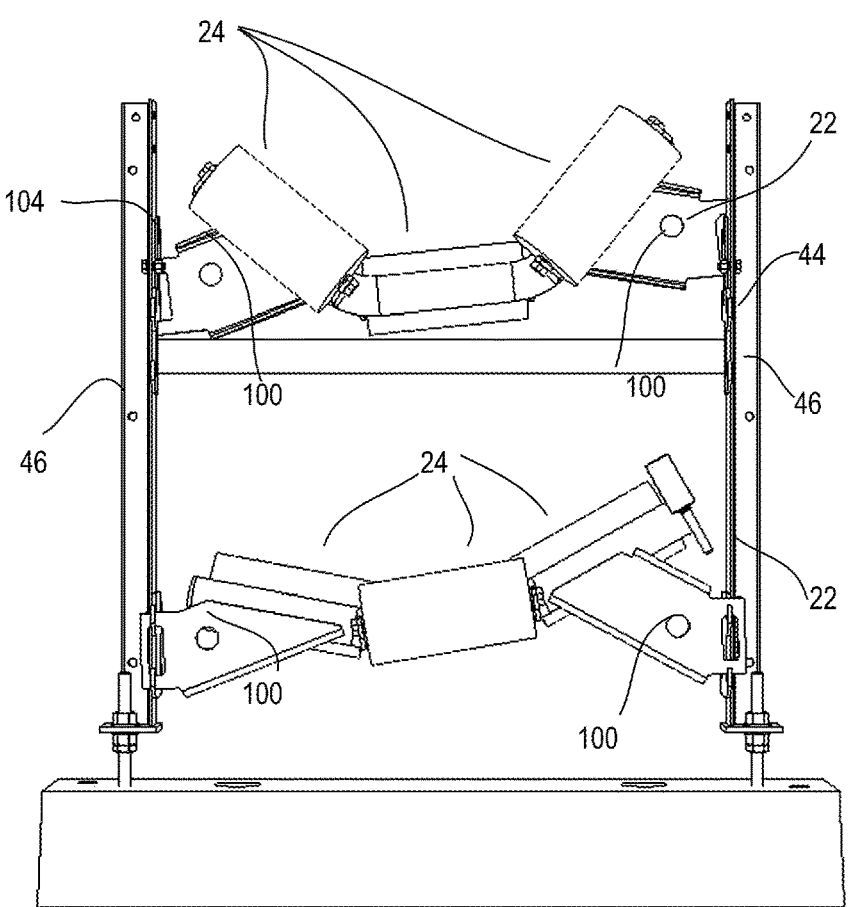
FIG. 5 is a front view of the H-frame component shown in FIG. 3 with a plurality of idler frames attached thereto.

In the example shown, the idlers 24 (FIG. 2) are attached to idler sub frames 22. These idlers 24 rotate about an axis of rotation relative to the idler fame 22 and thus reduce friction of the conveyor belt riding thereon compared to sliding friction of other conveyor belt examples which slide along a plate or table. The idlers 24 and/or an axle thereof are attached to the idler frames 22 and the idler frames 22 of this example are removably attached to a support frame such as the example H-frame 44 shown in FIG. 5. Each support frame may be fixed to the ground, floor or similar structure. Each H-frame 44 of this example comprises a plurality of substantially vertical struts 46 (46a, 46b) which support the idler frames 22 when the idler frames 22 attached thereto. In one example, the vertical struts 46 are connected via a cross strut and may rest upon and be supported by a frame base.

Before continuing, an axes system 10 is disclosed (FIG. 1), including: a longitudinal axis 12 aligned with the direction of travel 38/42; a vertical axis 14 orthogonal to the axis 12, and a transverse axis 16 orthogonal to each of the longitudinal axis 12 and vertical axis 14.

As can be seen in FIG. 4, each vertical strut comprises at least one idler frame bracket 50 (50a, 50b, 50c, 50d) for ease in attachment and removal of the idler frames from the support frames. In the example shown, the idler frame brackets 50 are configured to be attached to the vertical struts 46 in laterally opposed and vertically level pairs. Thus, idler frames 22 and longitudinally opposed lift frames temporarily attached the H-frames 44 will be substantially aligned with the conveyor belt 32. In the example shown, the brackets 50 are generally L-shaped, having a longitudinal component extending from the vertical strut 46 and a vertical component extending upward from the longitudinal component. Thus, idler frames and/or lift frames as well as other components having bracket receivers may be easily attached to the H-frames 44.

Wherein users/maintenance personnel often cannot safely work on the idlers in place, especially when the conveyor belt is operating and may be dangerous. It is well known that reaching into the conveyor system, past the pull cord plane 26, is unsafe due to the moving conveyor belt 32, material 36, idlers 24, and other dangers. The user's fingers, hand, arm, etc. may get caught by the moving components and severely damaged. Thus, common sense and safety regulations prohibit a user from reaching past the pull cord plane 26 defined by a vertical place extending substantially from the lateral edge of the conveyor belt. In one example, a pull cord line (cord) 52 may be provided at or laterally outward of the pull cord plane 26. In one example, actuation (pulling) of the pull cord line 52 sounds an alarm and/or may immediately stop the conveyor belt 32 from operating. In this disclosure, the side of the pull cord plane 26 facing the conveyor belt 32 will be called inside the pull cord plane while the opposing side is called "outside" the pull cord plane 26.

Figure 8:
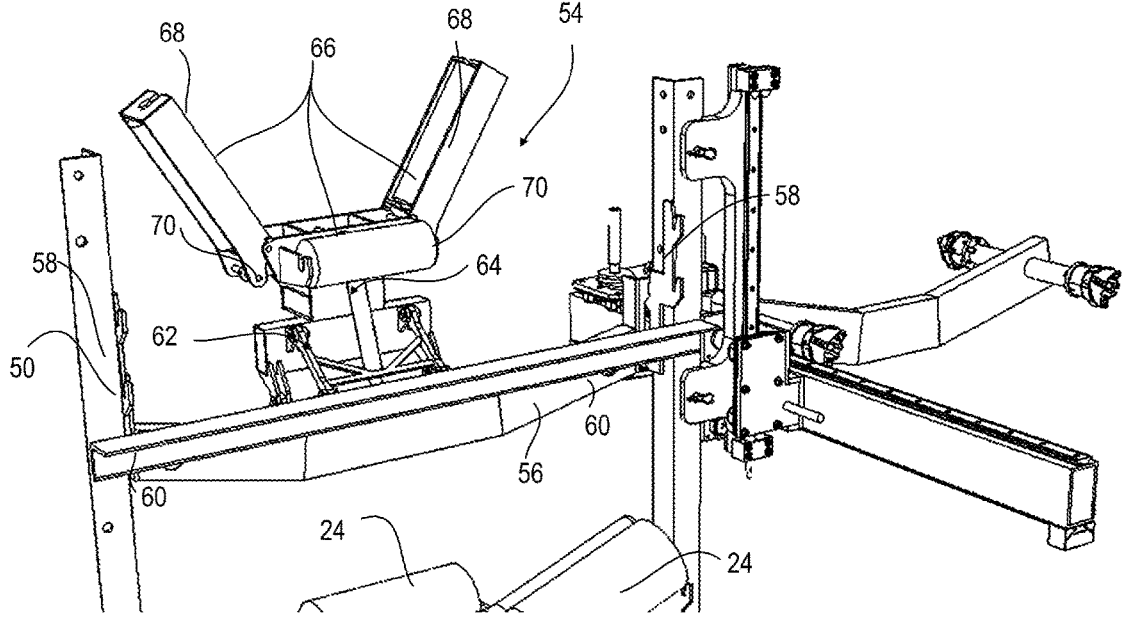
FIG. 8 is an enlarged view of the disclosed idlers replacement system shown in FIG. 1 after removal of the carry idlers and attached frame.
Figures 9, 10, 11, 12:
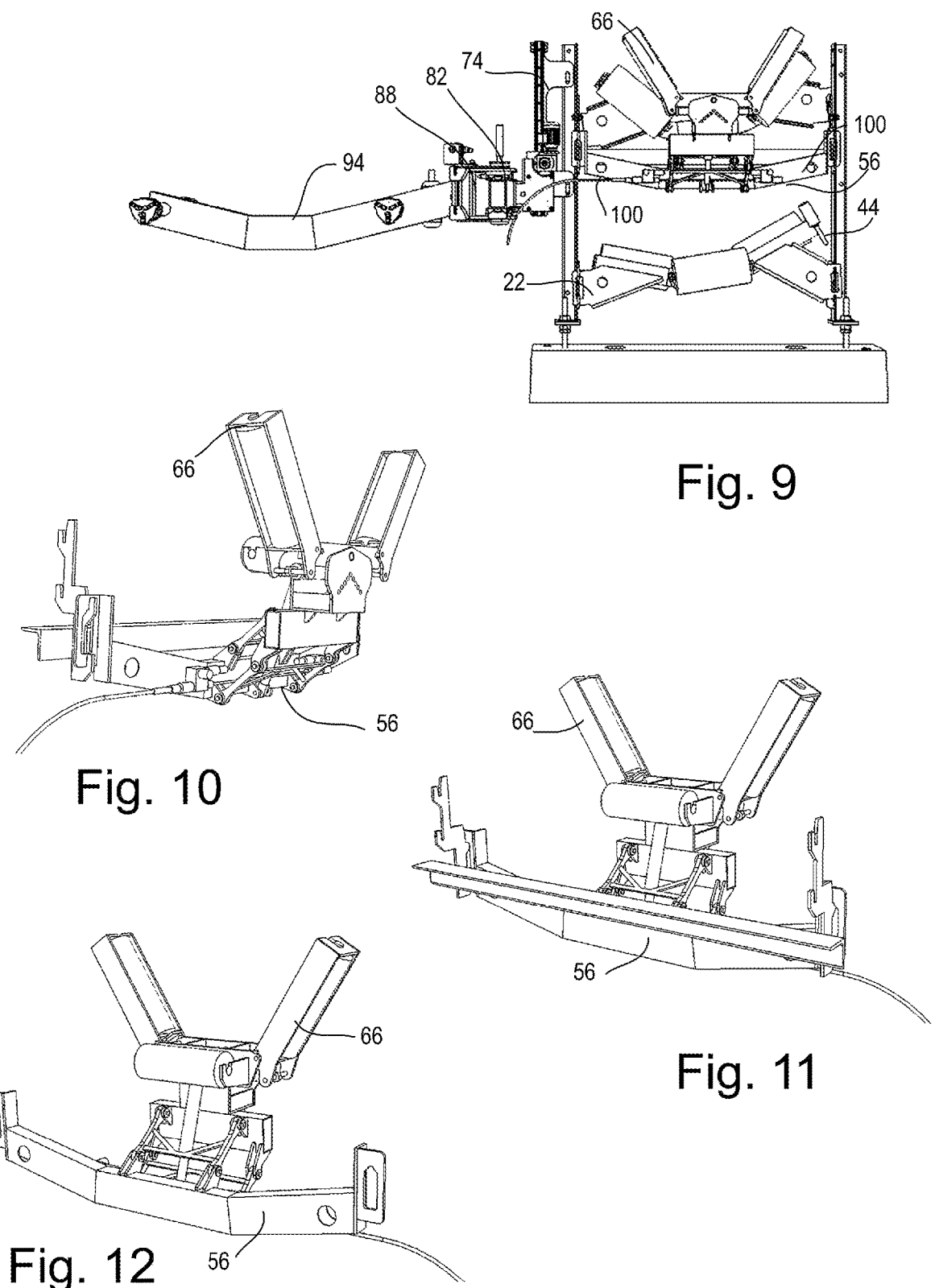
FIG. 9 is a front view of the disclosed apparatus.
FIG. 10 is a front isometric view of a lift assembly component.
FIG. 11 is a rear view of the component shown in FIG. 10.
FIG. 12 is a rear view of the component shown in FIG. 11 with an H-frame component not shown.
Figure 13:
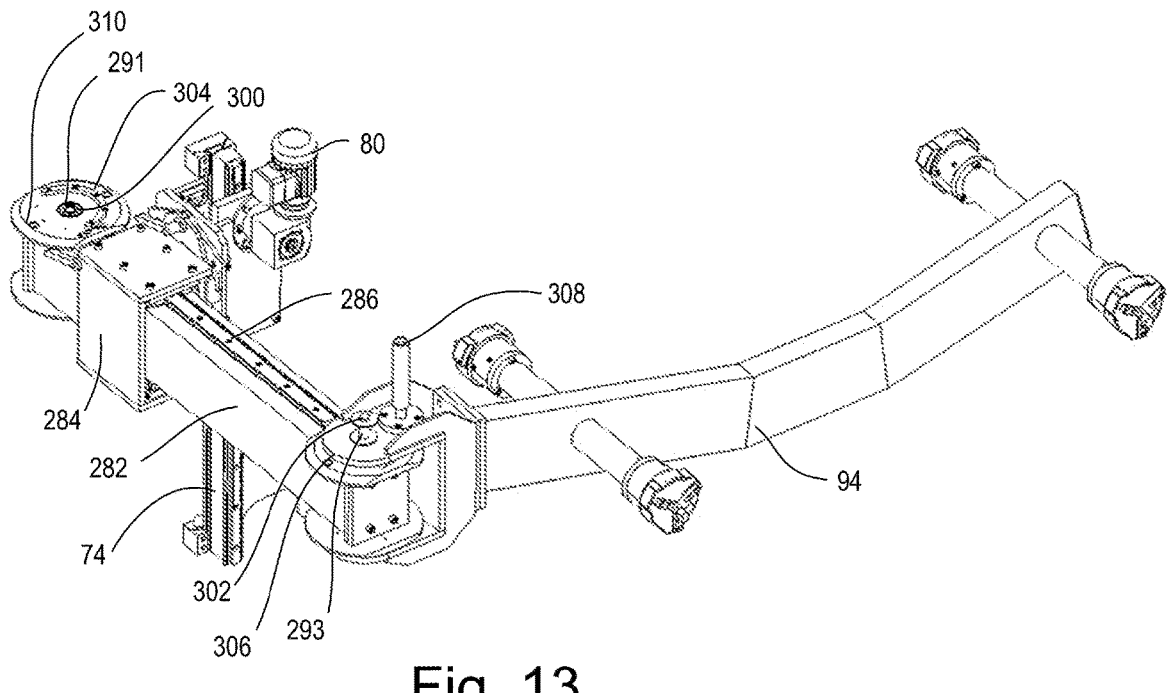
FIG. 13 is an alternate example of the disclosed conveyor idlers replacement system.
Figure 14:
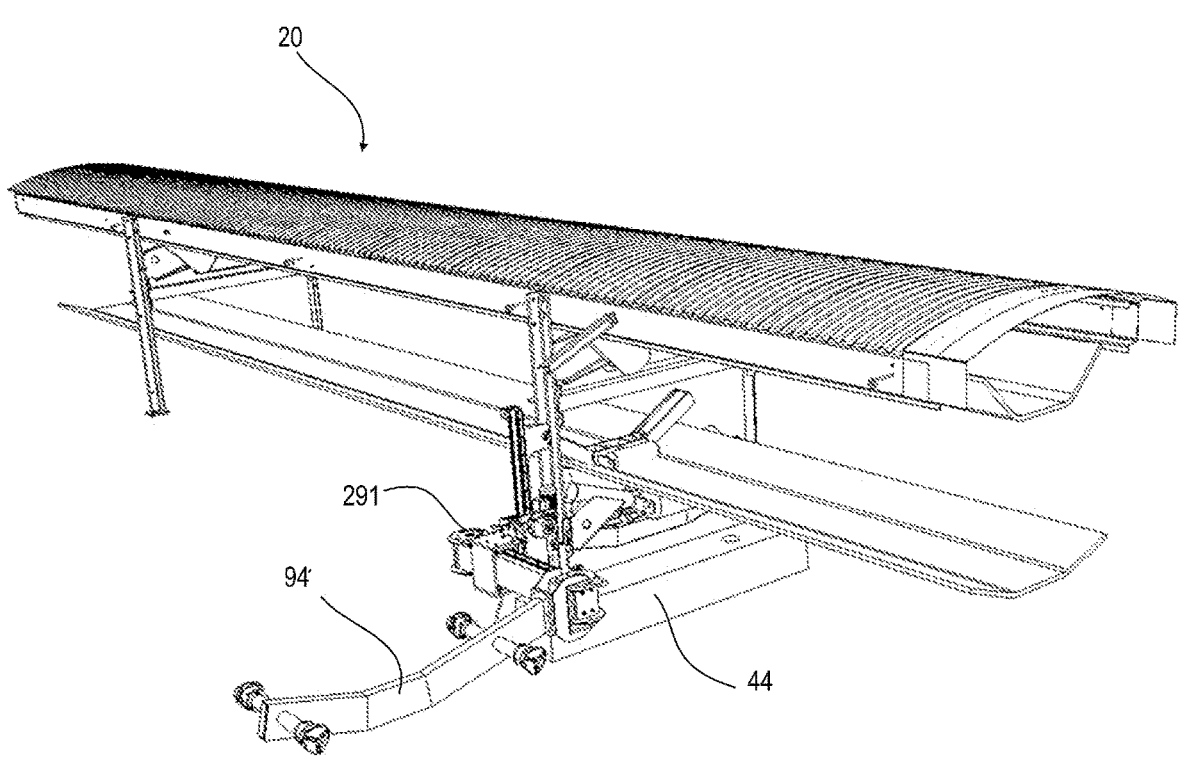
FIG. 14 is an environmental view of the example shown in FIG. 13.
Figures 15, 16:
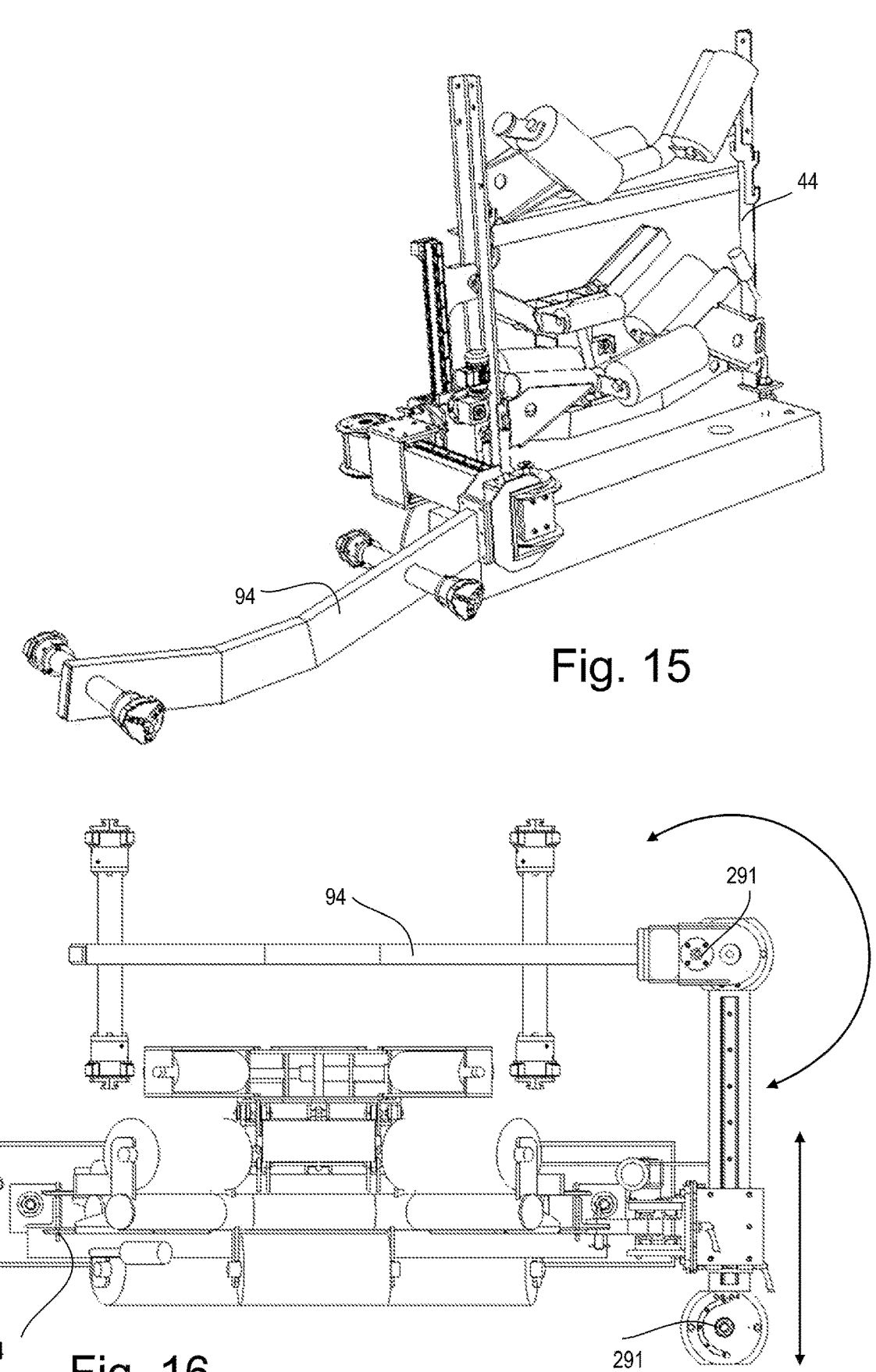
FIG. 15 is another view of the example shown in FIG. 13.
FIG. 16 is a top view of the example shown in FIG. 13.

To maintain the idlers 24 while continuing operation of the conveyor belt 32, the idlers 46 must be temporarily moved outside the pull cord plane 26. Where the idlers 46 are temporarily removed, the conveyor belt 32 should be supported in some other manner. For this, a second idler frame and/or lift assembly 54 may be employed. The lift assembly 54 as shown in FIG. 8 may be removably attached to the support frame 44 by way of brackets 50. The lift assembly 54 of this example comprises a lift frame 56 having bracket receivers 58 on each lateral end 60 to facilitate removable attachment to the support frame. These bracket receivers 58 engage the brackets 50 and thus removably attach the lift frame 56 and connected components to the H-frame 44.

In the example shown, the lift assembly 54 also comprises a lift mechanism comprising in this example a four-bar linkage 62 and lift actuator 64. The lift mechanism may incorporate lifting structures such as pneumatic actuators, hydraulic actuators, screw lifts, solenoids, or other mechanisms and combinations thereof. The lift mechanism configured to vertically reposition a sub frame and attached lift idlers 66 against the conveyor belt 32 and also lift the conveyor belt 32 off of the idlers 24. This configuration allows removal of the idler frame 22 and attached idlers 24.

In one example (FIG. 8) one or more idlers 66, e.g., idlers 68 are connected to the lift linkage 62 via one or more longitudinal pivots 70. Where the conveyor is convex, as shown in FIG. 1, these pivots 70 allow for adjustment of the angle of the idlers 68 so as to maintain the conveyor belt 32 in the shape needed to retain the material 36 on the conveyor belt 32. By using independent pivots 70, the conveyor belt 32 may be asymmetrically adjusted for corners etc.

To place the lift assembly 54 on the brackets 50, a positioning assembly 72 may be used. In the example shown, the positioning assembly 72 comprises several cooperating subsystems which will be discussed in detail. These separate components may be relatively easily stored, carried, transported, and assembled by users. These actions may be accomplished without mechanical advantage such as lifts etc., as the individual components are light enough to be lifted manually and set in place with easily connected brackets. For example, each separate component may weigh 50 #which is easily lifted and placed by a single user or small group of users. The components may also be connected one to the next by a single user or small group of users.

In the example of FIG. 2, the positioning assembly 72 comprises a lift arm 74 removably attached to the H-frame 44 by way of pins 76, bolts, brackets, couplers, or other structures and combinations thereof. In the example shown, the lift arm 74 comprises longitudinally extending protrusions which fit into substantially U-shaped upward facing receivers. The lift arm 74 of one example having a slide surface 78 as well as a vertical actuator 80. The actuator 80 may comprise a pneumatic actuator, hydraulic actuator, screw, solenoid, or other mechanism and/or combinations thereof.

In the example of FIG. 2, the positioning assembly 72 also comprises a slide arm 82. The slide arm 82 may be attached to a slide plate 84 or equivalent component of the lift arm 74 so as to vertically reposition on the slide surface 78 when the actuator 80 is operated. Thus, the slide arm 82 and all components attached thereto can be raised and lowered by the actuator 80.

The slide arm 82 of this example has a longitudinally aligned slide surface 86. In one example, this slide surface 86 is provided on the vertically upper and vertically lower surfaces of the slide arm 86. A slide arm plate 88 configured to longitudinally slide along the slide arm 82. In one example, slide stops 90 may be provided on either/each end of the slide arm 86 to prohibit the slide arm plate 88 and components attached thereto from sliding past the longitudinal ends of the slide arm 82. Roller bearings, T-slots, lubricants, and other materials may be used to reduce friction between the slide arm plate 88 and the slide arm 82. Another example is provided below with a different arrangement.

In one example, the slide arm plate 88 is substantially C-shaped. In this example the slide arm plate 88 contacts the upper and lower surfaces of the slide arm 86 through a pivot 91 having a vertical axis of rotation 92. When properly arranged, this arrangement allows the slide arm plate 88 to rotate up to 180° or more around the longitudinal end of the slide arm 82. The utility and advantages of this will be described below.

Looking still to FIG. 2, a grip arm 94 is shown removably attached to the slide arm plate and removably attached to the H-frame 44 by way of pins, bolts, brackets 96, couplers, or other structures and combinations thereof. In the example shown, the grip arm 94 comprises longitudinally extending protrusions which fit into substantially U-shaped upward facing receivers on the slide arm plate 88.

Figure 6:
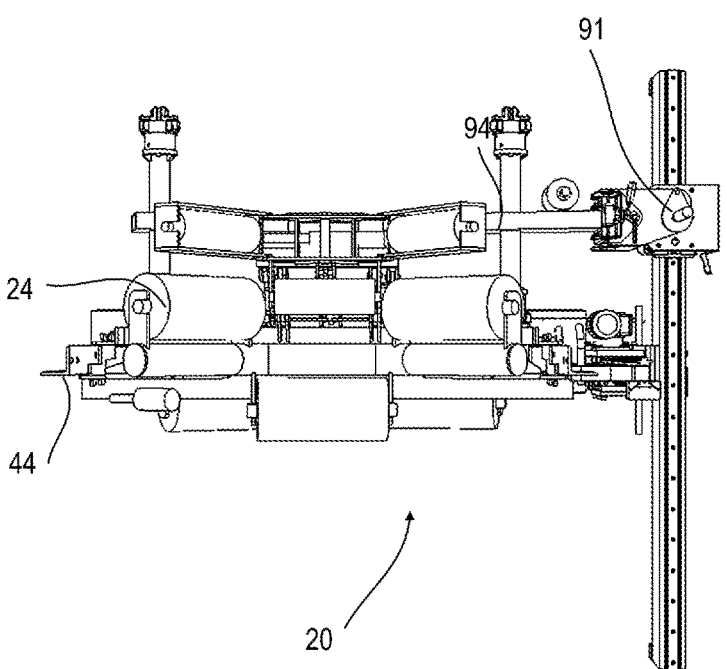
FIG. 6 is a top view of several components of the example shown in FIG. 1.
Figure 7:
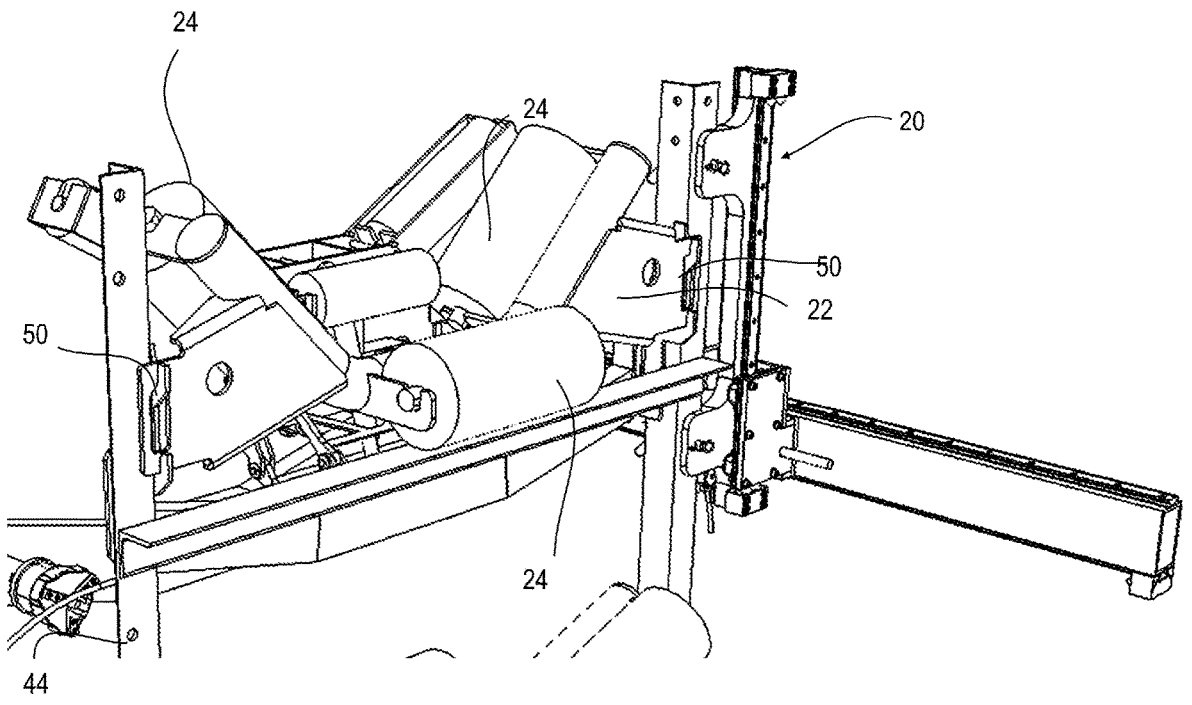
FIG. 7 is an enlarged view of the disclosed idlers replacement system shown in FIG. 1 in use to remove the carry idlers and attached frame.

The grip arm 94 in this example may be configured to be lifted vertically via the lift arm 74. The grip arm 94 may also be configured to be moved longitudinally via the slide arm 82, and then rotate 92 about the ends of the slide arm 82 into position adjacent the idler frame(s) 22 and/or the lift frame (s) 56 as shown in FIG. 6. For example, the lift assembly 54 may be positioned adjacent the grip arm 94 in the position of FIG. 2 exterior of the pull cord plane. Grips or clamps 98 on the grip arm 94 may be coupled to grip receivers 100 of the lift frame 56 to connect the grip arm 94 to the lift assembly 54. This arrangement allows the user to remove the idler frames 22 and attached components on either longitudinal side of the support frame 44.

During assembly of the conveyor idler replacement system 20, once the lift frame 56 is coupled to the grip arm 94, the combination of this example may be slid along the slide arm 82 to the longitudinal end, rotated 92 about the end to a position beneath the conveyor belt 32 either under the carry line 34 or under the return line 40. The lift frame 56 is positioned on the opposing longitudinal side of the H-frame 44 from the idler frame 22 to be removed. The lift arm 74 and lift actuator 80 may then be employed to position the bracket receivers 58 of the lift frame 56 onto the brackets 50 of the H-frame. One in this position, the clamps 98 may be released and the grip arm moved away from the lift frame 56.

One so emplaced, the lift actuator 64 may be employed to vertically reposition the lift idlers 66 and raise the conveyor belt 32 while in operation. The wing idlers 68 may then be rotated into position as desired. In this position, the lift assembly 54 supports the conveyor belt 32 above the idlers 24, such that the idler frame 22 and idlers 24 may be removed from the H-frame 44.

To accomplish removal of the idler frame 22 and attached idlers 24, the grip arm 94 may be moved longitudinally to the end of the slide arm 82, rotated 92 about the end of the slide arm 82 to the opposing longitudinal end and rotated about that end also. The grip arm 94 may then be longitudinally and repositioned along the slide arm 82 and vertically repositioned via the lift arm 74 to position the clamps 98 at the clamp receivers 100 of the idler frames. A pivot and/or slide lock 102 may be employed at any point to fix the linear and/or rotational position of the grip arm relative to the slide arm 82.

Once the grip arm 94 is engaged with the idler frame 22 via clamps 98, the lift actuator 80, slide arm 82, or other mechanism may be employed to remove the idler frame from the brackets 50. Once released, the grip arm 94 with idler frame 22 and idlers 24 attached thereto may be longitudinally, vertically, and rotationally repositioned external of the pull cord plane to be inspected and/or maintained.

Once the idler frame 22 and idlers 24 are replaced, repaired, or otherwise ready for re-installation, the grip arm 94 and attached idler frame 22 may be moved longitudinally to the end of the slide arm 82, rotated 92 about the end of the slide arm 82 to the opposing longitudinal end and rotated about that end also. The grip arm 94 and attached idler frame 22 may then be longitudinally repositioned along the slide arm 82 and vertically repositioned via the lift arm 74 to position the clamp receivers 104 of the idler frames 22 on the brackets 50.

The lift idlers 66 then may be lowered to test the idler frame 22 and if successful (if the repair replacement passes a diagnostic test), the grip arm 94 may then be repositioned to the opposing longitudinal side of the H-frame 44, the lift assembly 54 connected to the grip arm 94 and the lift assembly 54 removed.

Once the lift assembly 54 is removed from the H-frame 44, the grip arm 94 with attached lift assembly 54 may be positioned external of the pull cord frame for disassembly, or for subsequent removal of another idler frame 22.

In one example, the lift arm 74 is configured to remove both the idler frames 22 for the carry line 34 and for the return line 40. In the example shown the carry line 34 is positioned vertically 14 above the return line 40, thus the lift arm 74 must be sufficiently long to accomplish this.

In another example, weight of the replacement system 20 may be reduced by providing a shorter lift arm 74 which must then be removed and vertically repositioned to an adjacent vertical position on the H-frame for maintenance of the idlers 24 of the idler frames 22 for the carry line 34 and for the return line 40.

Looking to FIG. 13 through FIG. 16 is shown another example which includes modifications from the example previously presented. Many of these components may be interchanged or combined between examples. Some components which are similar to the previous example are labeled with a "2" prefix. For example, the slide arm 282 of this example replaces the slide arm 82 of the first example.

In this example, the lift actuator 80 lifts a slide arm carriage 282. The slide arm carriage 284 comprises slide or roller surfaces which engage the slide surface 286 attached to the slide arm 282 such that the slide arm 282 may longitudinally reposition relative to the carriage 284. On one or both longitudinal ends of the slide arm 282 are provided pivots 291 which engage cooperating structures (pivots 293) on the grip arm 94. In this example, the grip arm 94 must be repositioned to remove/replace the idler frames and belt lifting device on opposing sides of the support frame. This example however increases rigidity of the slide arm 282 as well as the pivots 291.

To facilitate an easy and secure attachment between the grip arm 94 and the lift arm 74, the pivots 291 comprise a surface defining a void 300 configured to receive a pin 302 which passed through the void 300 in a smooth fit. A similar surface defining a void provides the pivot 293 in the grip arm 94.

During assembly, a surface 306 of the pivot 293 contacts a semi-circular ridge 304 of the pivot 291 and aligns the void 300 with the pivot 293 for installation of the pin 302. In addition, cooperation (sliding contact between) the surface 306 and the semi-circular ridge 304 increases rigidity of the pivot which is important due to the torque exerted on this point during lifting of the idlers.

A spring loaded lock pin 308 may be utilized to lock rotation of the grip arm 94 about the pivot 291. In this example, the lock pin 308 may slide to engage a surface 310 defining a void in the slide arm to fix the grip arm in position to install/remove an idler frame or in position exterior of the pull cord line for working on the idler frame or components attached thereto.

In operation, the second example operates very similarly to the first example as described above. The lift arm of this example has mirror pivots 291 on opposing longitudinal ends thereof for easy movement of the grip arm 94 from one longitudinal end to the opposing longitudinal end.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

The invention claimed is:

1. A conveyor idler replacement system comprising:
a support frame fixed in place upon a base, comprising a first vertical strut extending from the base, a second vertical strut extending substantially vertically from the base;
each of the first vertical strut and second vertical strut comprising a first idler frame bracket on a first longitudinal side of the support frame;
a first idler frame extending between the first idler frame bracket on the first vertical strut and the first idler frame bracket on the second vertical strut;
at least one idler attached to the first idler frame, the idler configured to rotate, configured to support a conveyor belt;
a vertically extending lift arm removably coupled to the support frame, supported thereby;
a horizontally aligned slide arm removably coupled to the lift arm, supported thereby;
a grip arm removably and pivotably coupled to the slide arm via a pivot having a vertical axis of rotation;
the lift arm configured to vertically reposition the slide arm via a lift actuator;
the grip arm configured to pivot about at least one longitudinal end of the slide arm;
the grip arm configured to horizontally reposition linearly via the slide arm;
the grip arm configured to couple to and remove the first idler frame from the first idler brackets.

2. The conveyor idler replacement system as recited in claim 1 wherein each of the first vertical strut and second vertical strut comprise a third idler frame bracket on the first longitudinal side of the support frame vertically offset from the first idler frame bracket.

3. The conveyor idler replacement system as recited in claim 1 wherein each of the first vertical strut and second vertical strut comprise a second idler frame bracket on a second longitudinal side of the support frame opposing the first longitudinal side.

4. The conveyor idler replacement system as recited in claim 3 wherein each of the first vertical strut and second vertical strut comprise a fourth idler frame bracket on the second longitudinal side of the support frame vertically offset from the first idler frame bracket.

5. A conveyor idler replacement system comprising:
a support frame fixed in place, comprising a first vertical strut extending from the base, a second vertical strut extending substantially vertically from the base;
each of the first vertical strut and second vertical strut comprising a first idler frame bracket on a first longitudinal side of the support frame;
a first idler frame extending between the first idler frame bracket on the first vertical strut and the first idler frame bracket on the second vertical strut;
at least one idler attached to the first idler frame, the idler configured to rotate, configured to support a conveyor belt;
a vertically extending lift arm removably coupled to the support frame, supported thereby;
a slide arm removably coupled to the lift arm, supported thereby;
a grip arm removably and pivotably coupled to the slide arm via a pivot having a vertical axis of rotation;
the lift arm configured to vertically reposition the slide arm via a lift actuator;
the grip arm configured to pivot about at least one longitudinal end of the slide arm;
the grip arm configured to couple to and remove the first idler frame from the first idler brackets,
a second idler frame extending between a third idler frame bracket on the first vertical strut and a third idler frame bracket on the second vertical strut;
the second idler frame comprising a lift actuator configured to lift the conveyor belt off of the first idler frame; and
at least one idler attached to the second idler frame, the idler configured to rotate, configured to support the conveyor belt.

6. The conveyor idler replacement system as recited in claim 5 further comprising:
a plurality of wing idlers rotatably connected to the second idler frame.

7. A conveyor idler replacement system comprising:
a support frame fixed in place, comprising a first vertical strut extending from the base, a second vertical strut extending substantially vertically from the base;
each of the first vertical strut and second vertical strut comprising a first idler frame bracket on a first longitudinal side of the support frame;
a first idler frame extending between the first idler frame bracket on the first vertical strut and the first idler frame bracket on the second vertical strut;
at least one idler attached to the first idler frame, the idler configured to rotate, configured to support a conveyor belt;

a vertically extending lift arm removably coupled to the support frame, supported thereby;

a slide arm removably coupled to the lift arm, supported thereby;

a grip arm removably and pivotably coupled to the slide arm via a pivot having a vertical axis of rotation;

the lift arm configured to vertically reposition the slide arm via a lift actuator;

the grip arm configured to pivot about at least one longitudinal end of the slide arm;

the grip arm configured to couple to and remove the first idler frame from the first idler brackets, a pull cord plane defined by a vertical line, the laterally outward edge of the conveyor belt;

the grip arm removably affixed to the support frame exterior of the pull cord plane;

the grip arm configured to rotate in a horizontal plane from a first position exterior of the pull cord plane to a second position interior of the pull cord plane;

at least one clamp affixed to the grip arm;

the at least one clamp configured to affix the grip arm to the idler frame to remove the idler frame from direct connection to the support frame; and the grip arm configured to rotate the idler frame and attached idler frame exterior of the pull cord plane.

\* \* \* \* \*